Figure 3:
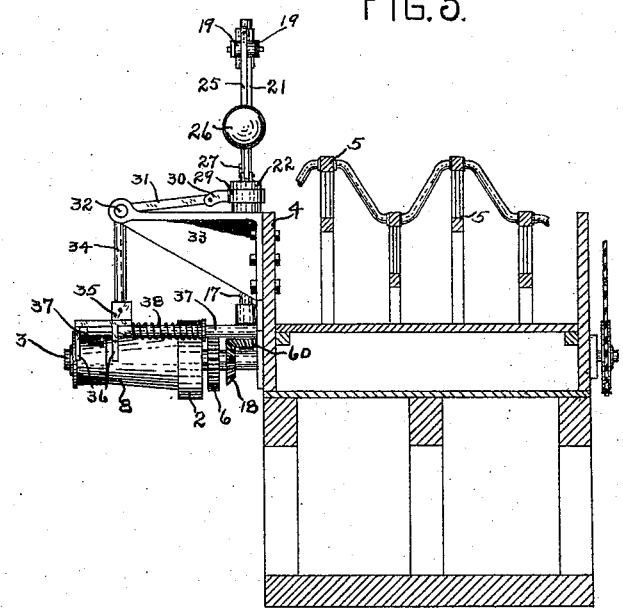

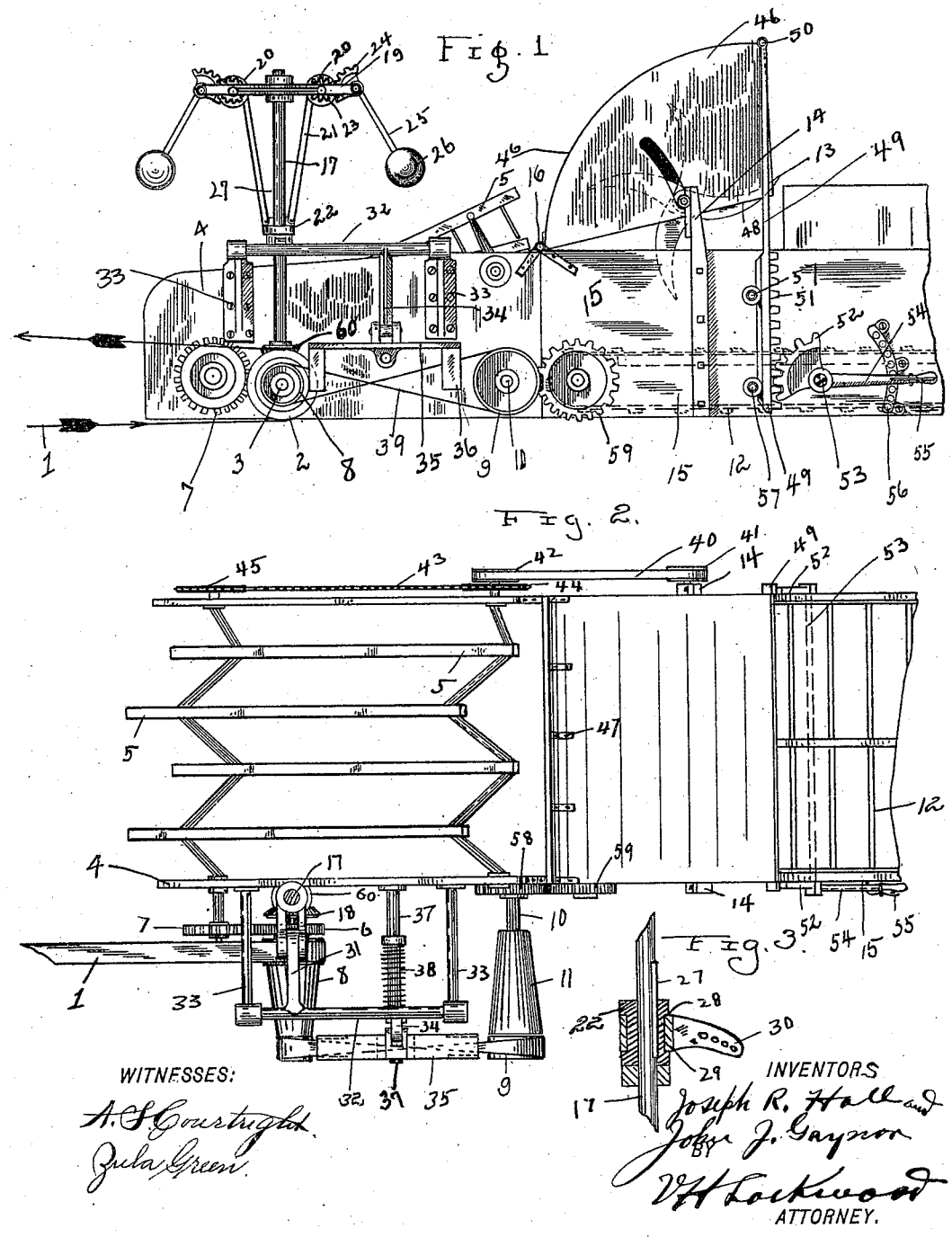

(No Model.) 2 Sheets—Sheet 2.
J. R. HALL & J. J. GAYNOR.
BAND CUTTER AND FEEDER FOR THRESHERS.

No. 575,567. Patented Jan. 19, 1897.

WITNESSES:
Horace B. Jones
Zula Green

INVENTORS
John J. Gaynor and
Joseph R. Hall
BY
V. H. Lockwood
Their ATTORNEY.

UNITED STATES PATENT OFFICE.

JOSEPH R. HALL AND JOHN J. GAYNOR, OF INDIANAPOLIS, INDIANA; SAID GAYNOR ASSIGNOR TO SAID HALL.

BAND-CUTTER AND FEEDER FOR THRESHERS.

SPECIFICATION forming part of Letters Patent No. 575,567, dated January 19, 1897.

Application filed February 5, 1896. Serial No. 578,171. (No model.)

*To all whom it may concern:*

Be it known that we, JOSEPH R. HALL and JOHN J. GAYNOR, of Indianapolis, county of Marion, and State of Indiana, have invented a certain new and useful Band-Cutter and Feeder for Threshers; and we do hereby declare that the following is a full, clear, and exact description thereof, reference being had to the accompanying drawings, in which like figures refer to like parts.

Our invention relates especially to the automatic regulation of the speed of the conveyer in a band-cutter and feeder for threshing-machines. Heretofore the automatic governing devices, so far as we are aware, would start the conveyer when the machine attained a certain speed and stop it when it was below that speed. Our device, after starting the conveyer soon after the main mechanism is started, thereafter automatically regulates the speed of the conveyer by increasing or reducing it to suit the speed of the machine. Another feature of our invention is the adjustability of the hood and knife-guards.

In the drawings, Figure 1 is a side elevation of our band-cutter and feeder attachment. Fig. 2 is a plan view thereof with the ball-governor removed, the front portion being broken away in each figure; and Fig. 3 is a detailed view of the slidable sleeve connection.

This device is connected up with a threshing-machine or separator in the usual way, and is driven from the mechanism that drives the threshing-cylinder by means of the belt 1, that passes over the pulley 2 on the shaft 3, mounted in the frame 4. This shaft drives the beater 5 through the spurs 6 and 7, but this forms no part of our invention. On the outer end of the shaft 3 is a cone-pulley 8 with its tapering end made cylindrical. Over the cylindrical end of this cone-pulley is a belt 39, running over the idler 9, on the shaft 10. Keyed up with this shaft 10 there is also a cone-pulley 11, mounted in a position reverse to that of the cone-pulley 8, and through it (the shaft 10) and the gears 58 and 59 the conveyer 12 is driven.

As is well understood, the bundles of wheat are thrown on the conveyer 12 and by it carried under the series of knives 13, mounted on the knife-shaft, supported by the standards 14, that are secured to the frame 15. The front and rear frameworks of the device are connected on each side by the hinge 16.

Mounted in the framework is a vertical rotary shaft 17, having a beveled gear 60 on its lower end, that meshes with the beveled gear 18 on the shaft 3. Rigidly mounted on such vertical shaft near its upper end is a pair of cross-bars 19, extending laterally in opposite directions, that carry on each side of the vertical shaft small wheels 20, having pivoted on them near their circumference the links 21, that extend downward and are pivoted loosely to the sliding sleeve 22. On the sides of the wheels 20 or on their shafts are spurs 23, that are engaged by the cogged segments 24, mounted on the outer end of the bars 19 and provided with the arms 25, having balls 26, adjustably mounted thereon.

The collar 29 is prevented from rotating independent of the shaft 17 by reason of the spline 27, which permits the sleeve 22 to be lifted or lowered by the links 21, and is provided with an annular groove 28, in which fits the collar 29, provided with a pair of arms 30. Loosely pivoted to these arms is a horizontal arm 31, that is secured to or made integral with a rock-shaft 32, which is carried and has bearings in the brackets 33. Secured to such rock-shaft 32 and extending downward is an arm 34, that at its lower end is loosely pivoted to a belt-shifter 35, which has two pairs of downwardly-extending fingers 36, one on each side of the belt. The belt-shifter 35 is carried on and slides to and fro upon a horizontal arm or rod 37.

From the foregoing description it is seen that through the belt 1, pulley 4, shaft 3, gear 18, and shaft 17 the ball-governors are rotated, and as the rate of rotation increases they swing outward and upward by reason of centrifugal force; and through the cogged segments 24, the spurs 23, the wheels 20, and links 21 the sleeve 22 is elevated and thereby the arm 31 rotates the rock-shaft 32, causing the lower end of the arm 34 with the belt-shifter on it to move inward. The belt therefore is moved inward farther as the speed on the machine increases, and by reason of the cone-pulleys being in reverse position in relation to each other the farther inward the belt is moved the speed of the conveyer is proportionately increased. The increase comes from the alteration of the diameter of that portion of the pulleys on which the belt is running. The belt is shifted outward by slacking the speed of the machine, whereby the governor-balls push down the sleeve 22 and, through the connecting mechanism before described, force the belt outward. If it is desired to reinforce the action of the governor in thrusting the belt outward, the spring 38 may be coiled about the arm 37 and bearing against the belt-shifter.

The knives 13, which have heretofore been referred to, are driven by the belt 40, running over the pulley 41 on the knife-shaft and the pulley 42 on one beater-shaft, which in turn is driven by the sprocket-chain 43, that runs over the sprocket-wheel 44 on the beater-shaft, and the sprocket-wheel 45 on the other beater-shaft, to which the power is transmitted originally. We claim no invention in regard to the knives, their mounting, or means for driving them. It will be noticed that the hood 46 is pivoted at its rear at 47, and has a slotted bottom 48, through which the knives operate, and in order to enlarge or decrease the opening under the knives for the sheaves to pass through we provide a pair of standards 49, pivotally connected to the hood, preferably at 50, with their lower ends provided with the rack 51, adapted to be engaged by the cogged segments 52, mounted rigidly on the shaft 53, which extends through the horizontal framework. A hand-lever 54 is placed on one segment 52, and on its outer end a spring-actuated catch 55 is mounted, that engages the holes 56, whereby the hood and guard may be elevated or lowered and held in any desired position. The standards 49 are held in place against the cogged segments 52 by means of a pair of sheave friction-wheels 57. For this purpose the rear of the standard is preferably V-shaped. This holds the standards in their proper position and enables them to be elevated with slight force. The standards 49, wheels 57, and the cogged segments 52 are duplicated on both sides of the framework and the power is transmitted from the hand-lever 54 through the shaft 53 to both alike.

What we claim as our invention, and desire to secure by Letters Patent, is—

1. In a band-cutter and feeder for threshers, the combination of a conveyer, a pair of reverse cone-pulleys, one of said pulleys driving the conveyer, suitable mechanism to drive the other pulley, a belt connecting the pulleys, a ball-governor actuated from the drive mechanism, a sleeve that is moved up and down by the governor, a belt-shifter, and a bell-crank pivoted in the framework of the machine with one end connected up with such sleeve and the other connected to the belt-shifter.

2. In a band-cutter and feeder for threshers, the combination with the conveyer, a pair of reverse cone-pulleys, one of such pulleys to drive the conveyer, an idler mounted adjacent to a pulley, a belt and suitable drive mechanism whereby the conveyer-pulleys are driven, of a ball-governor mounted on a suitable rotary shaft geared up with the drive mechanism, a sliding sleeve on the governor-shaft so connected up with the balls as to be reciprocated by them, a belt-shifter to shift the belt from the idler to the pulley and vice versa, and a bell-crank mechanism connecting the belt-shifter with the sliding sleeve on the governor-shaft.

3. In a band-cutter and feeder for threshers, the combination of a conveyer, a pair of reverse cone-pulleys, one of said pulleys driving the conveyer, suitable mechanism to drive the other pulley, a belt connecting the two pulleys, a governor actuated from the drive mechanism, a belt-shifter mounted so as to reciprocate on a rod, and shift the belt, a bell-crank that is actuated at one end by the governor and at the other end reciprocates the belt-shifter, and a spiral spring mounted on the belt-shifter rod that tends to cause the shifter to shift the belt into its idle position.

4. In a band-cutter and feeder for threshers, the combination with a hinged hood and knife-guard, of a pair of vertically-movable standards pivotally connected to the hood at their upper ends and provided with a rack at their lower ends, suitable guideways for such standards a shaft extending through the framework horizontally and provided at each end with a cogged segment to engage the racks on the lower ends of such standards, and means for rotating such shaft.

5. In a band-cutter and feeder for threshers, the combination with a hinged hood and knife-guard pivoted at its rear to the framework, of a pair of standards pivoted at their upper ends to the hood and provided with a rack at their lower ends, a shaft extending through the framework having on each end a cogged segment to engage such racks, a hand-lever for rotating the shaft, means for holding the hand-lever in any desired position, and friction-wheels on each side of the framework that hold the standards in place against the cogged segments.

In witness whereof we have hereunto set our hands this 17th day of January, 1896.

JOSEPH R. HALL.
JOHN J. GAYNOR.

Witnesses:
V. H. LOCKWOOD,
ZULA GREEN.